(12) United States Patent
Hu et al.

(10) Patent No.: US 7,577,790 B2
(45) Date of Patent: Aug. 18, 2009

(54) CACHING OF DYNAMIC ARRAYS

(75) Inventors: Shane C. Hu, Beaverton, OR (US); Keith R Slavin, Beaverton, OR (US)

(73) Assignee: Micron Technology, Inc., Boise, ID (US)

( * ) Notice: Subject to any disclaimer, the term of this patent is extended or adjusted under 35 U.S.C. 154(b) by 187 days.

(21) Appl. No.: 11/381,658

(22) Filed: May 4, 2006

(65) Prior Publication Data
US 2006/0195661 A1  Aug. 31, 2006

Related U.S. Application Data

(60) Division of application No. 10/785,786, filed on Feb. 24, 2004, now Pat. No. 7,114,034, which is a continuation of application No. 09/901,811, filed on Jul. 10, 2001, now Pat. No. 7,127,559.

(51) Int. Cl.
*G06F 12/02* (2006.01)
(52) U.S. Cl. ...................................... 711/118
(58) Field of Classification Search .................. 711/118
See application file for complete search history.

(56) References Cited

U.S. PATENT DOCUMENTS

| | | | |
|---|---|---|---|
| 4,077,058 A | 2/1978 | Appell et al. | |
| 5,184,320 A | 2/1993 | Dye | |
| 5,249,282 A | 9/1993 | Segers | |
| 5,297,270 A | 3/1994 | Olson | |
| 5,493,666 A | 2/1996 | Fitch | |
| 5,526,506 A | 6/1996 | Hyatt | |
| 5,537,359 A | 7/1996 | Toda | |
| 5,555,379 A * | 9/1996 | Silla ............................. | 711/3 |
| 5,586,325 A | 12/1996 | MacDonald et al. | |
| 5,751,996 A | 5/1998 | Glew et al. | |
| 5,761,477 A | 6/1998 | Wahbe et al. | |
| 5,829,026 A | 10/1998 | Leung et al. | |

(Continued)

OTHER PUBLICATIONS

Kandemir, M., et al., "Improving Memory Energy Using Access Pattern Classification", *Proceedings, IEEE/ACM International Conference on Computer Aided Design*, (Nov. 4-8, 2001),201-206.

(Continued)

*Primary Examiner*—Hyung S Sough
*Assistant Examiner*—Hamdy S Ahmed
(74) *Attorney, Agent, or Firm*—Schwegman, Lundberg & Woessner, P.A.

(57) ABSTRACT

Systems and methods are provided for caching dynamic arrays. According to one aspect, a cache memory device is provided for caching dynamic arrays or dynamic overlays. According to one embodiment, the device includes a plurality of memory cells and at least one register for storing access information to access at least one array stored in the plurality of memory cells. According to another aspect, an electronic system is provided that includes a main memory, a dynamic array cache memory device, a general cache memory device, and a processor. The dynamic array cache memory device is coupled to the main memory and adapted for caching array data. The general cache memory device is coupled to the main memory and is adapted for caching regular data. The processor is coupled to and adapted for communication with the main memory, the general cache memory device, and the dynamic array cache memory device.

20 Claims, 3 Drawing Sheets

U.S. PATENT DOCUMENTS

| | | | |
|---|---|---|---|
| 5,898,858 | A | 4/1999 | Gillespie |
| 6,002,410 | A * | 12/1999 | Battle .................. 345/552 |
| 6,014,723 | A | 1/2000 | Tremblay et al. |
| 6,047,363 | A | 4/2000 | Lewchuk |
| 6,138,209 | A | 10/2000 | Krolak et al. |
| 6,145,057 | A | 11/2000 | Arimilli et al. |
| 6,157,981 | A | 12/2000 | Blaner et al. |
| 6,185,673 | B1 | 2/2001 | Dewan |
| 6,199,173 | B1 | 3/2001 | Johnson et al. |
| 6,219,725 | B1 | 4/2001 | Diehl et al. |
| 6,240,499 | B1 | 5/2001 | Spencer |
| 6,279,152 | B1 | 8/2001 | Aoki et al. |
| 6,282,583 | B1 | 8/2001 | Pincus et al. |
| 6,288,923 | B1 | 9/2001 | Sakamoto |
| 6,430,656 | B1 * | 8/2002 | Arimilli et al. .............. 711/128 |
| 6,665,775 | B1 | 12/2003 | Maiyuran et al. |
| 6,665,864 | B1 | 12/2003 | Kawahito et al. |
| 6,675,253 | B1 | 1/2004 | Brinkmann, Jr. et al. |
| 6,721,760 | B1 | 4/2004 | Ono et al. |
| 6,826,669 | B1 | 11/2004 | Le et al. |
| 7,062,761 | B2 | 6/2006 | Slavin et al. |
| 7,114,034 | B2 | 9/2006 | Hu et al. |
| 7,127,559 | B2 | 10/2006 | Hu et al. |
| 2002/0069400 | A1 | 6/2002 | Miloushev et al. |
| 2002/0123981 | A1 | 9/2002 | Baba et al. |
| 2002/0144244 | A1 | 10/2002 | Krishnaiyer et al. |
| 2002/0169935 | A1 | 11/2002 | Krick et al. |
| 2003/0014607 | A1 | 1/2003 | Slavin et al. |
| 2003/0196039 | A1 | 10/2003 | Chen |
| 2004/0015923 | A1 | 1/2004 | Hemsing et al. |
| 2004/0205697 | A1 | 10/2004 | Hylands et al. |
| 2006/0221747 | A1 | 10/2006 | Slavin et al. |

OTHER PUBLICATIONS

Park, J. W., "An Efficient Buffer Memory System for Subarray Access", *IEEE Transactions on Parallel and Distributed Systems*, 12(3), (Mar. 2001),316-335.

Sarawagi, S., et al., "Efficient Organization of Large Multidimensional Arrays", *Proceedings of the 10th International Conference on Data Engineering*, IEEE Press,(1994),328-336.

Sheth, V. R., et al., "Real Time Failure Analysis of Cu Interconnect Defectivity Through Bitmap Overlay Analysis", *IEEE/SEMI Advanced Semiconductor Manufacturing Conference*, (Sep. 8-10, 1999),8-13.

Verdier, C., et al., "Access and Alignment of Arrays for a Bidimensional Parallel Memory", *Proceedings of the International Conference on Application Specific Array Processors*, IEEE Press,(1994),346-356.

Weinhardt, M., et al., "Memory Access Optimisation for Reconfigurable Systems", *IEE Proceedings—Computers and Digital Techniques*, 148, (May 2001),105-112.

* cited by examiner

CACHING OF DYNAMIC ARRAYS

RELATED APPLICATIONS(s)

This application is a Divisional of U.S. application Ser. No. 10/785,786 filed Feb. 24, 2004, now U.S. Pat. No. 7,114,034 which is a Continuation of U.S. application Ser. No. 09/901,811 filed Jul. 10, 2001 now U.S. Pat. No. 7,127,559 which are incorporated herein by reference.

TECHNICAL FIELD OF THE INVENTION

This invention relates generally to integrated circuits and, more particularly, to systems and methods for caching dynamic arrays.

BACKGROUND OF THE INVENTION

Main memory, such as dynamic random-access memory (DRAM), provides high storage densities. However, main memory is relatively slow. Caching, i.e. storing duplicate data in cache memory, is intended to improve the performance of a processor by providing high speed access to data if the data already is in the cache memory. An effective cache thereby reduces the number of accesses to the main memory. When a processor requests a main memory access (i.e. a read or write) at a new main memory address, the address and associated data will also be stored in the cache memory. Each address and its associated data in the cache are stored as an object called a cache entry. A cache hit occurs if the processor requests information at a main memory address, and a matching cache entry is stored in the cache memory. A cache miss occurs if a matching cache entry is not stored in cache memory.

In order to detect a cache hit or miss for high speed accesses, multiple address comparisons are performed in parallel to determine if any address in a cache entry matches the requested address. Because cache memory contains both cache entry storage and address comparison hardware, cache storage is relatively expensive to other memory in terms of the amount of hardware or silicon area per bit of data storage. Therefore, in a balanced system, cache memories are able to cache much less data than can be stored in main memory. The cache memory appears invisible to the processor, such that all processor reads and writes appear to operate as if they occurred to the main memory.

If a cache hit occurs on a processor read, the cache memory supplies the requested data to the processor in less time than that which is required for receiving the same data directly from the larger main memory. If a cache hit occurs on a processor write, then a write will be directed to the corresponding item in the cache. In a copy-back cache, the main memory is left unchanged, and the updated value in the cache is marked as changed or dirty with respect to the main memory. The processor is able to operate more efficiently because of the cache memory, as it is able to resume normal processing without waiting for the main memory.

If a cache miss occurs on a processor read, then a copy of the requested data is retrieved from the main memory stored in the cache memory. The requested data also is sent to the processor. If a cache miss occurs on a processor write, then the cache is updated with the new data.

When the cache is filled with valid data and a cache miss occurs, a new data item displaces an older one in the cache. The displaced data item or victim data is flushed out of the cache. If the victim data is dirty, then it should be written back to the main memory. Otherwise, the victim data is discarded if it is not different from its corresponding value in main memory.

An isolated write to main memory is usually a low-delay (or low latency) event, as an address value and the data to be written at the address are presented to the main memory together. In contrast, a read from main memory is relatively high latency, as it starts with the presentation of an address to the main memory, followed by a relatively long wait before the data appears from the main memory.

In relatively slow main memory systems, the minimum time allowed between responses to any memory access events is also relatively long. As such, a memory access may cause the memory system to hold off or delay a subsequent access until it is ready. A rapid sequence of cache misses can result in the main memory holding off the cache for each cache miss, which in turn must hold off the processor. A result is slow memory access rates or low data throughput into main memory.

In most processing systems, a compiler is used to compile high-level language concepts into machine code for execution on a processor. Some calculations can be performed at compile-time, while others are performed at run-time when the program is running on the processor. Values that may change during run-time are dynamic, whereas values that are compiled as constant during run-time are static. The sizes of many declared storage objects are often static, although their contents are usually dynamic. For example, sometimes data storage size requirements are constant and can be statically calculated at compile-time, while other memory allocation is problem-size dependent and must be dynamically calculated and dynamically allocated at run-time.

An array is an arrangement of information in one or more dimensions, such as a one-dimensional list, or a color component of a two-dimensional image. Multi-dimensional arrays are those arrays with two or more dimensions. The individual data items in the array are called elements. All elements in the array are of the same data type so all elements in the array are also the same size. The array elements are stored contiguously in the computer's memory. The address of the first element in the array is the array base address.

An element within an array can be accessed through indexing. In a higher-level computer language, indexing is applied to an array, usually by following the array name with square brackets that indicates the offset or the distance between the cell to be accessed and the first cell of the array. For example, the statement X[0] accesses the first element in the X array, and the statement X[1] accesses the second element in the X array.

In a computer language, the size of an array is declared to reserve an amount of memory within which the array elements are contained. The amount of memory required to hold an array can be measured in machine bytes. A byte is the smallest addressable unit used in a processor—usually equal to 8 bits. The number of bytes required to hold an array is equal to the number of elements in the array times the size of each element in bytes. Processors usually access data from a cache in machine words, which are multiples of bytes and are usually powers-of-two multiples such as 2, 4, or 8 bytes.

For one-dimensional array access used in higher level languages, the compiler generates machine code instructions to: scale the one-dimensional array index by the element size (in machine bytes) to form a byte offset; add the offset to the array base byte address in memory to form an element address into main memory; and read data from or write data to the main memory, starting at the element address, and where the number of bytes transferred equals the element size in bytes.

To avoid adding an additional offset to the index in the first step above, most popular higher-level languages take the first element of the array as that element with index 0. For dynamically changing index values, these index calculations must be performed for each array access at run-time, and are relatively slow.

Two-dimensional indexing uses two indices. For example, the index X[2][3] can access a two-dimensional array. By convention, in two-dimensional arrays, the first index value (2 in the example) is regarded as the row index, and the second is the column index value (3 in the example). One way of accessing memory as a multi-dimensional array is to use information about the number and size of dimensions in an array to calculate an index mapping expression. The index mapping expression is then used to map multiple indices applied to an array onto a single index that can then be applied to the memory as if it is a one-dimensional array. In a higher-level language, the number and size of array dimensions is obtained from an array declaration. For example, a two-dimensional array may be declared using code like:

int arry[height][width];

The corresponding index mapping function is:

index_1d=row_index*width+col_index

This expression maps row and column indices onto a one-dimensional index. Note that the row index is multiplied by width, whereas the column index is multiplied by 1. In an index mapping function, the larger the scale factor applied to an index, the more major it is. In the example above, a row-major, column-minor indexing scheme is used. Note that the width of the array is used in the index mapping expression in the two-dimensional case. In general, all array dimensions except the most major dimension are required to calculate the index mapping expression. A higher-level language compiler can use the array declaration to generate machine code to evaluate the index mapping expression at run-time as a function of the index values applied to the array.

This process of reducing all access to a simple memory address means that the processor data cache has to handle intermingled array data access and non-array data access. The fragmented nature of most non-array data access makes it very difficult to infer any type of data access patterns for arrays within the data cache.

In some caches, wide data paths (compared to the machine word size) between the main memory and cache can sometimes result in newly requested data words being already present in the cache from a previous nearby request. In most programs, because of the fragmented nature of data access in general, the use of wide access paths results in reading data from memory that is often never used. In general, wide paths between the main memory and the cache result in a considerable increase in memory bandwidth, with only a small corresponding reduction in cache miss-rates.

The first time each new item is requested, it does not exist in the cache yet, so a cache miss occurs on all new data. If the cached data is then used relatively few times, the number of memory accesses raises in proportion to the number of requests for array data from the processor via the cache. In the extreme case, if the processor uses each array item only once, then the cache is also useless in enhancing processor performance. This data re-use factor is algorithm dependent, but is at its worst in very simple algorithms such as for copying arrays.

For low data re-use, the relative frequency of cache misses is the primary cause of slow average memory access performance. In many simpler DSP algorithms, the processor spends as much or more time on memory access than on the actual arithmetic operations performed on the data itself.

Therefore, for large arrays there is a need in the art to provide a system and method that overcomes these problems by providing hardware acceleration of array element access and by speculatively pre-loading array data in a cache memory.

DETAILED DESCRIPTION OF THE INVENTION

Figure 1:
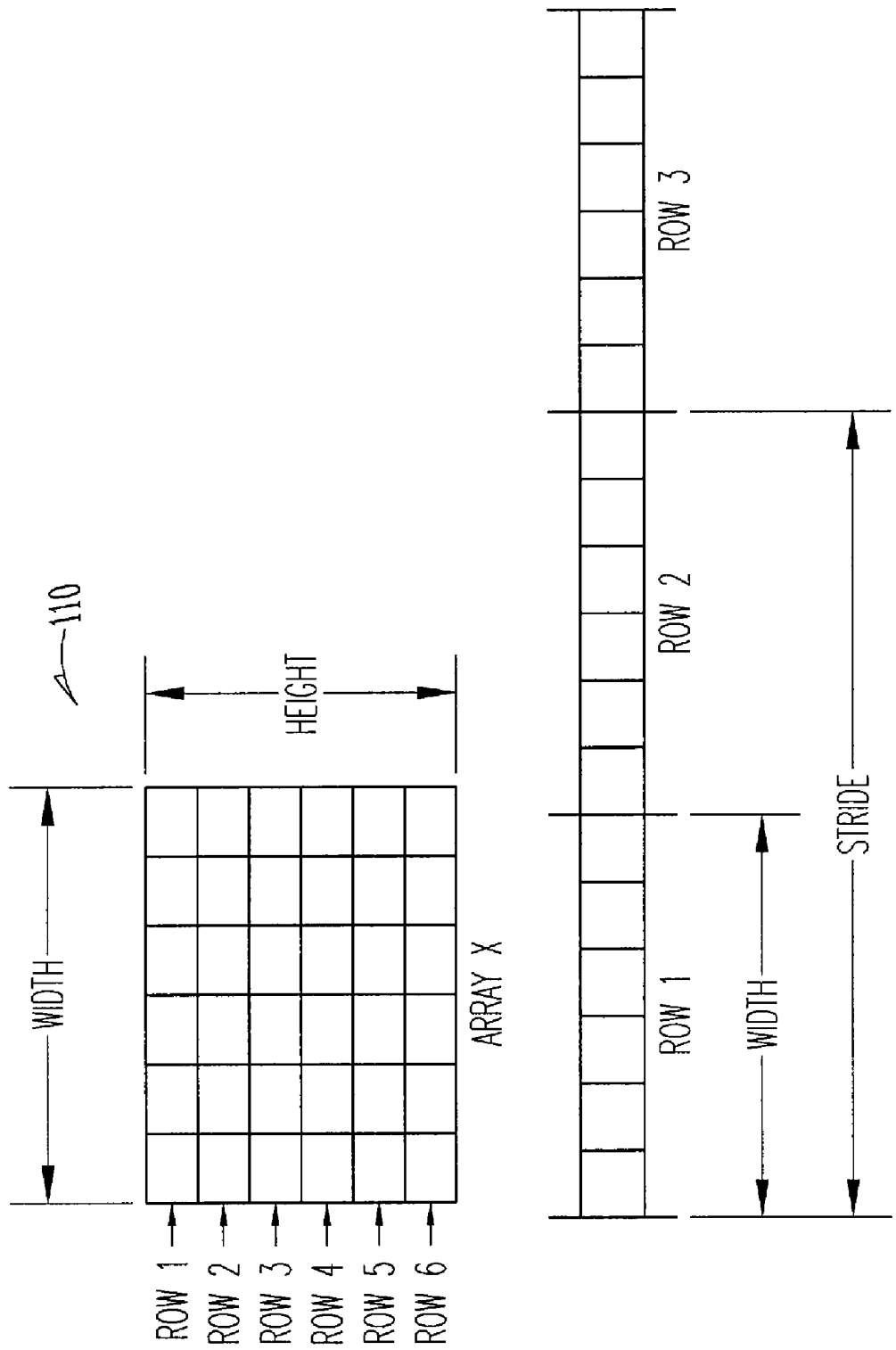
FIG. 1 illustrates a two-dimensional array stored in a one-dimensional memory, and illustrates width, height, and stride attributes for two-dimensional arrays in an interlaced video processing illustration in which the stride is twice the width.

The following detailed description of the invention refers to the accompanying drawings that show, by way of illustration, specific aspects and embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims, along with the full scope of equivalents to which such claims are entitled.

The present subject matter relates to dynamic overlay hardware, and a cached dynamic array (CDA) hardware cache, and further relates to their use in speeding up processor access to array elements. According to one embodiment, the dynamic overlay array access mechanism can be combined with dynamic allocation of memory to create dynamic arrays, i.e. arrays whose size can be calculated at run-time.

Users typically program processors in a higher-level language than machine instructions. For a practical CDA system, a modified compiler is used to accept dynamic overlay and dynamic array declarations, and then compile them to make use of the dynamic overlay machine instructions. Use of the dynamic overlay machine instructions requires changes to the machine code that the compiler generates.

A dynamic overlay provides a dimensional array element access mechanism or view on existing data. The dynamic overlay has attributes that are set during program execution. The compiler generates code to set some of the array attributes based upon dynamic overlay or dynamic array declarations. Attributes such as the sizes of the array dimensions (used in index mapping expressions), the element size, and the array base address are set before the array elements can be accessed. The array attributes are read as part of the array access mechanism. The index mapping expressions are used with the indices applied to an array to obtain a one-dimensional offset into the array memory as if it were a one-dimensional array. The offset is then scaled by the element size attribute and added to the array base address attribute.

A dynamic array is formed by combining dynamic memory allocation (e.g. using the C language malloc( ) and free( ) facilities) and a dynamic overlay on the allocated memory to allow indexed array access into the dynamic array.

The use of the dynamic overlay mechanism separates array accesses through an overlay from regular data traffic. According to one embodiment, array access through the dynamic overlay mechanism uses the CDA cache, while other data traffic use a conventional separate cache mechanism. The CDA system includes array descriptor registers, each adapted for storing array attribute information. Some of these attributes are constant for a given array and can therefore be calculated at compile-time. Other attributes are calculated at run-time. The array attributes are accessed through a handle value associated with each array. If a compiler is used to generate the machine code instructions on the processor, then an allocation mechanism in the compiler can map array references in the programming language onto handle values in the machine code.

The present subject matter describes CDA hardware for speeding up array access of dynamic array or dynamic overlay data. According to one embodiment, a CDA system comprises array attribute storage, index mapping and address calculation hardware, a CDA cache, and a processor with dedicated dynamic overlay machine code instructions. According to one embodiment, the system also includes hardware for boundary policy enforcement on array indices.

Dynamic overlays allow a processor to use multi-dimensional array indexing to access data in memory. The data may have an implied multi-dimensional structure. For example, a sequence of video samples can represent a two-dimensional scanned image because the width of the image in samples is known. However, the implied multi-dimensional structure is flattened to lie in a contiguous one-dimensional memory region. If index-mapping expressions are implemented in a clocked hardware pipeline, then an upper limit on the number of array dimensions is determined, as each additional dimension beyond the first requires an additional multiplier in the pipeline. For example, the following three-dimensional index-mapping expression can be used for array element access:

index_1d=((frame_index*height)+row_index)
*width+column_index;

In this example, frame_index, row_index, and column_index are applied to an index mapping expression in major-to-minor index order. The corresponding array depth, height, and width are array size attributes. The most major dimension (depth) is not needed in the array mapping expression, although it is needed as part of boundary policy enforcement. The index mapping expression can be implemented as a series of multiplies and adds. For example, to calculate index_1d above, the frame_index value is multiplied by the height, then the row_index is added, the result is multiplied by the width, and the column_index is added. Higher numbers of dimensions can be supported. Each extra dimension requires another multiply-add nesting in the index mapping expression above, which also increases the pipeline depth and array access latency.

Array size attributes are usually obtained from array declarations in a higher-level language. For example, the following is a declaration of a three-dimensional array of int types using the above array sizes:

int arry[depth][height][width];

From this C declaration, other array attributes such as the element type (int) and element size in machine bytes (e.g. using sizeof(int) in the C language) are obtained. If this declaration uses dynamic memory allocation, the amount of memory needed to store all the array elements (in bytes) is obtained by multiplying all the dimension sizes and the element size together. The resulting amount of memory is requested (e.g. in C using malloc( ) from the heap, or alloc( ) from the stack) and a base address of contiguous memory is obtained. The array attributes are then loaded into array attribute storage hardware to allow fast array element access. Calculating array attribute values is relatively infrequent compared to array access, so conventional processing instructions are adequate to perform this task.

If the number of dimensions used in array element access is fewer than this limit, then unused dimensions can be set to 1, and index values of zero can be applied to those same dimensions during array element access. Single dimensional arrays are therefore supported as a trivial sub-case.

Arrays can also be supported with more dimensions than are supported by the index mapping hardware. These multi-dimensional arrays are split into arrays of arrays (e.g. 2 passes), or arrays of arrays of arrays (e.g. 3 passes), for example. The number of array dimensions handled at each access pass is preferably up to the hardware limit if possible. Each array is an array of handles to other arrays, except for arrays at the last pass, which contains the actual array elements. Compilers can be adapted to handle multiple passes transparently to the programmer.

For most DSP tasks involving images, it is preferable to support two dimensional array access in index mapping expression hardware. For audio applications, one-dimensional access may be sufficient, and more economical in hardware. For graphics rendering systems, three-dimensional array access hardware support may be preferable.

Processor instructions are provided to specify an array handle value and array element indices for an array element access. As part of an array access, the handle value selects the set of array attributes to access from within attribute storage. The array attributes are then combined with the array element indices in the index mapping expression to obtain the mapped (one-dimensional) index into the flattened array data in memory. The mapped index is converted to a byte offset by multiplying or scaling the index by the array element size. The byte offset is then added to the array element storage base address to obtain the byte address of the indexed element in main memory. Other processor instructions are provided to set, and possibly read the attributes of each array.

In a practical system, the array attributes are used to speed up array access such that they use fast, dedicated memory that is separate from the main memory. Therefore only a limited number of array attributes can be simultaneously available in array attribute storage hardware. In applications where more simultaneously accessed arrays are required than are supported in the fixed hardware limit, array attributes capable of being moved in and out of main memory under processor control, but not via the CDA array cache mechanism.

Dynamic arrays are dynamic overlays combined with conventional one-dimensional dynamic memory allocation (e.g. using a function call like malloc( ) in the C language). Dynamic allocation is supported with conventional processor instructions. Dynamic overlays require dedicated indexed array access instructions to be added to the processor instruction set. Dynamic arrays do not require any processor machine code instructions to be added beyond those added for dynamic overlays.

The array attribute values include array information, such as the memory base address used for array element storage, and for two-dimensional array index support, the array height, width, and stride, which are used for index mapping and boundary policy enforcement calculations. Boundary policy enforcement ensures that the indices applied to an array are restricted in some manner to lie within the width and height attributes of the array. For fast array element access, boundary policy enforcement should preferably be implemented in hardware. Boundary policy enforcement is applied to indices before they are used in index mapping. If boundary policy enforcement is not provided, then there is an increased chance of out-of-bounds array accesses bugs due to the code complexity of handling array boundary conditions. If the width attribute is used in boundary policy enforcement, then a separate stride attribute is used instead of the width in index mapping expressions.

According to one embodiment, a high-level language compiler is preferably used to generate the machine code instructions that are run on a CDA processor. The compiler can process language extensions used to declare dynamic arrays and dynamic overlays, provide transparent CDA hardware resource management to make the best use of limited number of array handle values, and transparently handle higher numbers of array dimensions using arrays of arrays. Co-pending U.S. application Ser. No. 09/901,806 entitled DYNAMIC ARRAYS AND OVERLAYS WITH BOUNDS POLICIES, assigned to Applicants' assignee and filed on Jul. 10, 2001, describes dynamic array code. As such, U.S. application Ser. No. 09/901,806 is hereby incorporated by reference.

The following description applies to two-dimensional hardware support for CDA array access. One of ordinary skill in the art would understand, upon reading and understanding this disclosure, how to devise similar arrangements for any number of dimensions.

With most methods of packing two-dimensional data into one-dimensional memory arrays, adjacent columns in the same row are at adjacent addresses in memory, but adjacent rows in the same column are spaced apart by at least the number of elements per row or the stride. This type of packing of two-dimensional data into one-dimensional storage uses row-major indexing to access array elements. In other words, the stride gives the number of elements in the allocated memory from an element to the one above or below it in an adjacent row. The stride attribute value is used in index mapping expressions instead of the width attribute value. The width attribute value is then used exclusively for defining boundaries as part of boundary policy enforcement. For a given array, the stride attribute value should be greater than or equal to the width attribute value. The stride value is now used to impose the programmer's view of how to access pre-allocated data in two-dimensional dynamic overlays. The width, height, and boundary policy attributes can be used to impose a window on that two-dimensional data view which restricts the array elements that are accessible.

Use of the stride attribute is shown in FIG. 1, which shows a miniature 6×6 image 110 as a two-dimensional array. The data is stored in one dimension as row data packed end to end. In applications where the image is being processed as a frame of video data, all rows are accessed to the full width and height attribute values. In interlaced video processing, for example, rows 1, 3, and 5 belong to a video field 1, and rows 2, 4, and 6 belong to field 2. In this case, the camera that captured the video data may have captured field 1 at an earlier time than field 2, so any motion would result in some objects appearing at different positions if each field were viewed separately. Motion-based DSP algorithms usually work best when the image being analyzed is grabbed near one point in time, so they work best if these two fields are processed separately. Dynamic arrays can achieve this by setting the stride value equal to twice the width value, and halving the height value. That way, the array can be viewed as a 12 element wide by 3 element high image, with field 1 on the left and field 2 on the right. If the width is 6, then the dynamic array boundary policy will only allow elements from field 1 to be accessed. The boundary policy behavior will result in the elements in field 2 being completely ignored—i.e. its elements will have no affect on any subsequent calculations applied to field 1. To process field 2, the width value is added to the base address to obtain a new base address value that is then passed to the dynamic overlay declaration. If the width, height, and stride values remain unchanged, the dynamic array boundary policy will now provide protected access to field 2 in a similar manner to field 1. Additionally, field 2 uses the same valid index ranges as field 1 (i.e. 0-5 for the minor column access, 0-2 for the major row access).

Figure 2:
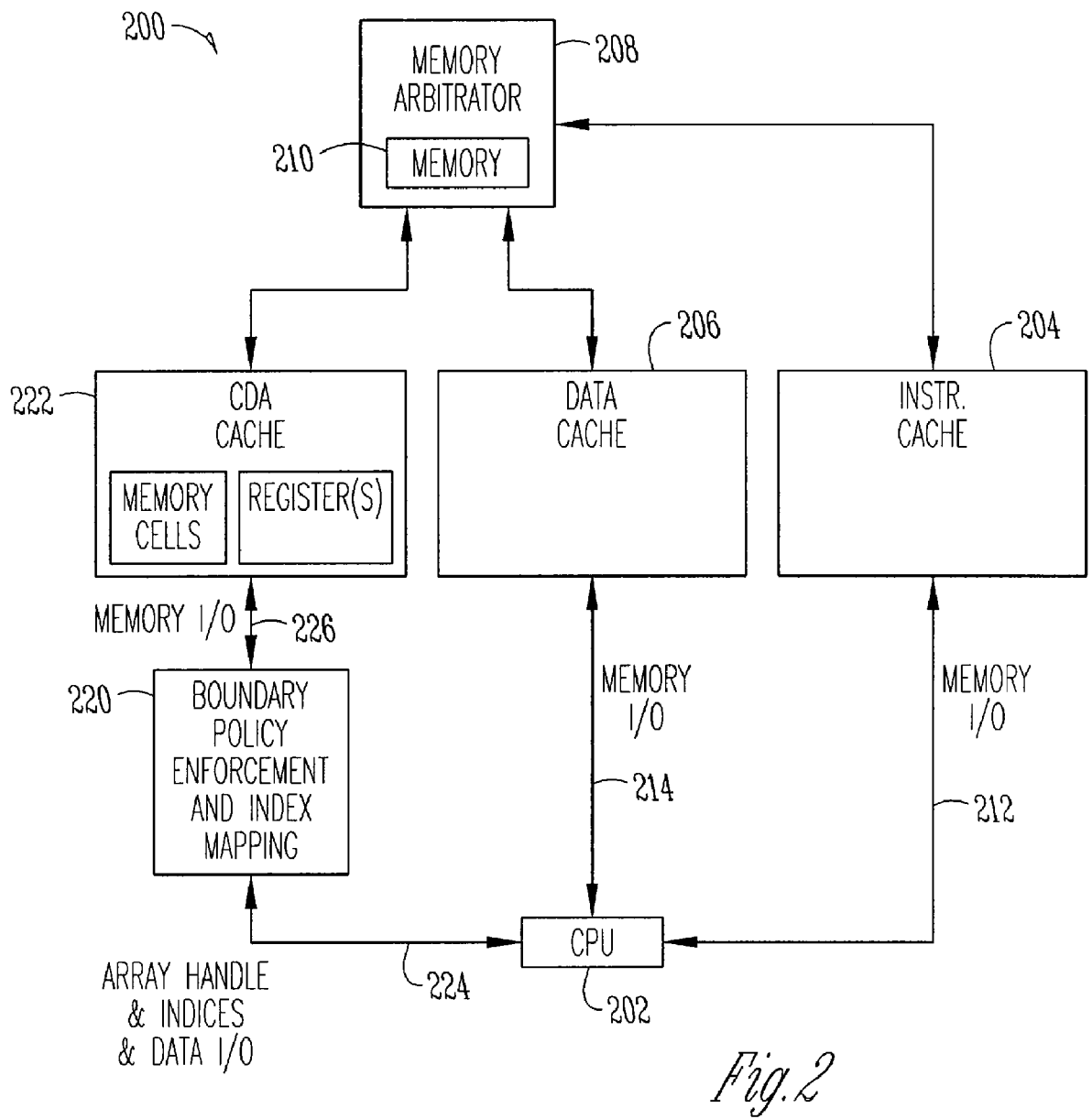
FIG. 2 is a block diagram of one embodiment of an electronic system that incorporates the present invention.

FIG. 2 is a block diagram of an electronic system 200 that incorporates the present invention. The electronic system 200 includes a processor 202, a main memory 210 with a main memory access arbitration unit 208, an instruction cache memory 204, a boundary policy enforcement and index mapping unit 220, and a CDA cache memory 222. The processor 202 is coupled to and communicates with the cache memories 204, 206 and the boundary policy enforcement and index-mapping mapping unit 220. The unit 220 includes memory for storing attributes for each array. The processor 202 can select an array using an array handle value, and read or write its attributes using dedicated machine code instructions. The processor instructions also include means for passing the array indices to the unit 220. The boundary policy enforcement uses array attributes to confine the range of indices applied to an array to conform within known limits. The index mapping part of unit 220 uses array attributes to convert the confined multi-dimensional indices into one-dimensional offsets into the allocated memory of an array. The final main memory address to access an array element is calculated, and presented to the CDA cache 222, along with other array attributes. If an array write is occurring, the processor must also forward the data via 220 to the CDA cache 222.

Generally, cache memory such as the instruction cache 204, data cache 206, or the CDA cache 222 are each smaller but much faster than the main memory 210. If the caches have a high hit rate, and memory access is frequent, then processor performance is significantly improved as it does not have to wait for the relatively slow main memory. One of ordinary skill in the art, upon reading and understanding this disclosure, will understand that many conventional data cache designs and many instruction cache design are capable of being incorporated into the electronic system 200.

The high hit rate of the CDA caching mechanism is such that a second-level cache is no longer required to main memory, so no such second level cache is shown in FIG. 2. This results in CDA systems having a higher memory performance with less hardware than in a conventional DSP processor system.

The flow of information between the processor and each cache is based on the instructions that the processor is executing at the time. The independent paths between the processor and each of the caches support higher performance in comparison to shared paths. For a read event, the processor sends out a read request instruction to the appropriate cache, and expects data back from the same cache. When the main memory receives an instruction from a particular cache to read from an address, the data read from memory is sent back to the same cache. If multiple caches attempt to access the main memory 210 at the same time, then the memory arbitrator decides which cache is allowed access, and the access requests from the other caches are delayed. If the caches are effective, then fewer cache-memory data transfers occur, and the chance of simultaneous data requests from different caches is reduced.

In the case of the CDA cache 222, when a request from the processor 202 is for array access, the request is sent through the unit 220 and mapped onto a main memory address to read or write an array element in main memory. In the CDA cache, the address is compared with a set of addresses corresponding to CDA cache entries. If the address matches one of these set of addresses, and if the address in the set is valid, then a cache hit has occurred. Initially, all addresses are set as invalid, so that no false hits will occur due to spurious matches with un-initialized cache addresses. Therefore, a match means that the CDA cache 222 already contains a cache entry for the requested address, and therefore the CDA cache will service all read or write requests to it while the entry is in the cache.

On a processor read request at an address that results in a CDA cache hit, the matching CDA cache entry contains the requested data that is immediately forwarded back through the unit 220 to the processor. With respect to a copy-back cache design, on a processor write request at an address that results in a CDA cache hit, the cached data is also forwarded from the processor and written into the matching cache entry, but not into the main memory. The copy-back cache design is desirable when the maximum throughput of the main memory is low. The cache entry is then marked as dirty. The data associated with a dirty cache entry is probably different from the data associated with the corresponding requested address in the main memory.

The following description of the cache-memory interaction is most easily understood when the data path widths between the processor and the CDA cache are the same as between the CDA cache and the main memory, and also the same as the array element size. In general, this is not the case, and the CDA cache has to be suitably adapted to differing path widths (although each path width is constant in real hardware) using techniques well known by those skilled in the art. Also, for each array element access, the array element sizes depending upon the array element size attribute. Techniques for enabling the required bytes within a bus so as to deal with different element sizes are also well known in the art.

The initial description is similar to that of a conventional cache behavior. On a processor read miss, the address is forwarded to main memory arbitration 208 by the cache. The main memory arbitration lets the access through to the main memory at some point, which then returns the requested data to the cache. The cache forwards the data back to the processor (a direct path even though it is illustrated as a path through the unit 220), and also creates a copy of the data and its associated address as a cache entry in the cache memory. The stage of reading data from the main memory is relatively slow compared with the cache performance in other circumstances. The CDA cache is now ready to speed up cache hits at that address. On a processor write miss, the data from the processor immediately creates cache entries similar to the read miss case, but the entry is marked as dirty, and main memory is not involved at all.

Sooner or later, the cache has had enough cache misses to fill all its cache entry capacity, with no room for further misses. If another cache miss occurs, room must be created in the CDA cache for the new cache entry. An old cache entry must be selected as a victim and flushed out of the cache. This cache victim can be discarded if it is not dirty. If it is dirty, then the main memory must be updated from the victim cache entry, which is easy as the cache entry contains the address and the data at that address. Again, this access to main memory is slow. A sequence of cache misses can therefore result in low memory throughput.

To avoid the low memory throughput problem, the data width between the CDA cache and the main memory can be much wider than the data path from the CDA cache to the processor. Such a wide word path between the cache and main memory is best implemented when the wide words are a power of two in byte width. They are therefore also a power-of-two multiple of the array element size. The wide word approach is particularly practical for a system-on-a-chip, where the entire circuit 200 may be put into one chip. The main memory can be embedded DRAM, which supports very wide bus widths.

Cache misses can be reduced for each array if nearby array accesses in time also are assumed to be spatially localized, i.e. close in array index terms. The cache can take each array element access, and check if neighboring array elements are also loaded into the cache.

If an entry is not already in the cache, it can be speculatively loaded from the main memory into the cache before the processor needs it, thereby reducing cache miss rates considerably for regular array access patterns. This process can occur independently for each array. In practice, most two-dimensional processing reads data in row-major order. For row-major indexing, the minimum number of cache entries required by speculation for each array is reduced if only the next entries along a row are speculatively loaded. i.e. entries with a higher column index value than the current accessed column, but still in the currently accessed row, are loaded. For wide word systems, each word may represent several array elements, so simply loading the next wide word up in memory from the current working wide word is all that is required. If the array attributes are made available to the CDA cache from unit 220, then more intelligent decisions on speculative cache loading can be made, reducing cache miss rates still further.

In conventional processing systems, programming with array accesses using indexing is a simpler, but slower, way for accessing elements in the memory array, compared with faster, but more error-prone address arithmetic. To compensate for this, the boundary policy enforcement and index mapping function within 220 is implemented in hardware, as are all the other blocks of FIG. 2.

Figure 3:
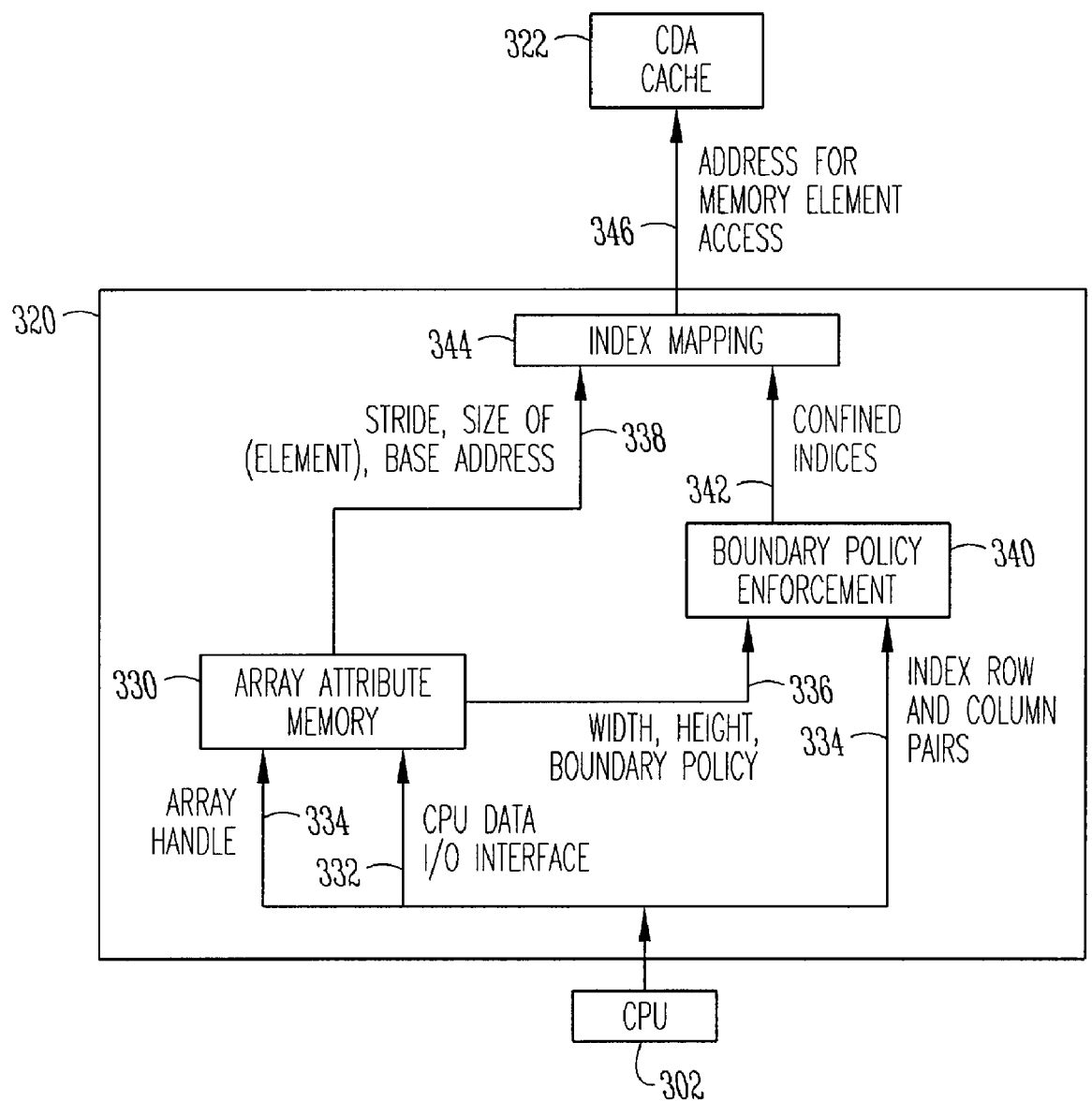
FIG. 3 is a block diagram of one embodiment of an electronic system for array access that processes an array base address and set of two-dimensional indices to obtain memory addresses for array element access.

FIG. 3 is a block diagram 300 that describes the block 220 in FIG. 2. FIG. 3 shows an attribute memory 330 that contains attribute data for some maximum number of arrays. For two-dimensional array support, attributes comprise an array width, height, boundary policy, stride, element size, and memory base address. The attribute memory for each array is initialized using special processor machine code instructions to control the array handle bus 328 as the attribute memory address, and the data i/o interface 332 as the attribute memory data. When the processor executes an array access via a dynamic overlay, array handle values are issued on 328, and index row and column values are issued on input 332.

A finite number of arrays are simultaneously supported in hardware because of the hardware overhead required to store the attributes associated with each array handle. Therefore only a small number of control bits are needed to represent the handle selection. In one embodiment, a maximum of 32 arrays can be supported, which can be selected using just 5 bits within a special array-handle-access instruction. This small number of bits frees up other bits within the processor's CDA array access instructions to be used for other purposes such as array index values.

When an array handle value 328 is presented to the attribute memory 330, the required set of attributes 338 and 336 are obtained as a memory lookup. The width, height and boundary policy attributes 336 are then applied to unit 340 along with the row and column indices 334 from the processor. Based on the boundary policy attribute chosen, a set of confined indices 342 is obtained. The confined indices 342 are applied to the index mapping calculation hardware 344, which also takes the stride, element size, and base address values 338 from the memory lookup 330 to calculate the element address 346. The element address is forwarded to the CDA cache, along with read/write control, data, and any other items needed for main memory or CDA cache access.

In conventional processor architectures, performance is usually improved to some degree by modifying a cache to load wider words from the memory into the cache than are used from the cache to the processor. A cache entry is able to store a wide word and its wide-word aligned address in main memory. A performance improvement is possible if the processor later uses the extra data arising from the wide memory access. This loading of un-requested data is a simple form of speculative cache loading. Speculative loading of data is based on the spatial locality concept: if one memory location is accessed, then nearby memory locations are also likely to be accessed. However, regular data traffic to memory also includes access via the processor stack that is less systematic in the way it accesses memory. Once all types of memory accesses have been combined into a single path, vital information is lost, and is difficult to deal with without using a cache with more entries. If array access is directed through the CDA cache, then speculation on array access patterns can be more effective.

In one embodiment, when a wide word is accessed in the CDA cache, it is also possible to load nearby wide words, even though they have not been accessed yet. This allows the data to be loaded into the cache from slow memory before systematic array access has reached a new wide word from an adjacent one. This approach allows the cache to have a much higher hit rate.

In one embodiment for two-dimensional arrays, if incremental column indexing loops within row index loops are used, i.e. column-minor or row-major indexing, it is likely that the next wide word to be used within a row is the following wide word in memory because of the contiguous nature of the array data. According to one embodiment, a cache-entry or wide-word aligned speculative address is generated immediately after each CDA cache access. The hardware that loads the CDA cache from the main memory is then re-used to load the neighboring wide word into a cache entry if it is not there already.

In one embodiment, the speculative loading process is refined to further reduce CDA cache misses for two-dimensional arrays by loading the beginning of the next array row after reaching the end of the current row. In one embodiment, wide words are not loaded into the CDA cache if they lie entirely beyond the width of the array, but entirely before the start of the next row. This is only possible if the array width is less than its stride. In another embodiment, when accessing elements at the end of the array, the wide word containing the elements at the start of the array is speculatively reloaded into the cache. This behavior is based on the assumption that an entire array is accessed within a program loop or nested program loops, and therefore array indices are about to resume at the start condition.

According to one embodiment, a copy-back CDA cache design is used in preference to a write-through cache design. A write-through cache architecture writes data to main memory at the same time that it is cached; whereas, a copy-back or write-back cache architecture writes data to main memory only when it is forced out of the cache through a flush operation.

One embodiment of the CDA system is used with a large, wide embedded DRAM as main memory. A general-purpose processor administers and loads instructions into one or more processors. Each processor is tied to its own CDA cache through which it can effectively share the same DRAM due to the low CDA cache miss rate. Benefits of the present subject matter as incorporated in this embodiment include improved system flexibility, functionality, time-to-market and system performance.

CONCLUSION

The present subject matter provides a cached dynamic array system that uses array indexing and knowledge of the array structures to provide effective cache loading speculation. Benefits include faster development of software, time-to-market, and system performance. The present subject matter applies the information regarding the dynamic array data structure to provide effective cache loading speculation of declared dynamic arrays in a separate CDA cache. Caching dynamic array or dynamic overlay array elements stored in a separate cache can take advantage of the systematic way in which arrays are accessed, resulting in a very high cache hit-to-miss ratio. When a processor accesses an array element, the CDA cache can also ensure that certain nearby array elements are also loaded into the cache before the processor needs them. To improve performance, wide words can transfer multiple array elements between the cache and main memory. In this case, CDA cache performance is further improved by speculatively loading the next wide word that does not contain the current array element being accessed. Since the array elements are stored contiguously in memory, most or all of the data elements that have been cached will be used. Thus, speculative loading will not incur the DRAM access bandwidth problems that are often associated with the speculative loading of regular data traffic in a general cache.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. A device for communicating with a processor and for caching array data, comprising:

a cache memory configured to store a plurality of m-dimensional arrays;

array attribute storage hardware configured to store array attributes, to receive an array handle from the processor, and to provide selected array attributes according to the received array handle; and an index mapping hardware configured to communicate with the cache memory and to index the m-dimensional arrays in the cache memory using the selected array attributes, the index mapping hardware configured to support n-dimensional arrays in a single pass.

2. The device of claim 1, further comprising array attribute storage hardware configured to store the array attributes used to index the m-dimensional arrays into the cache memory.

3. The device of claim 1, wherein the index mapping hardware is adapted to support two-dimensional arrays used in digital signal processing (DSP) tasks involving images.

4. The device of claim 1, wherein the index mapping hardware is adapted to support three-dimensional arrays used in graphics rendering tasks.

5. The device of claim 1, wherein m equals n, and the index mapping hardware is adapted to index multi-dimensional arrays into the cache memory using a single access pass.

6. The device of claim 1, wherein n is less than m, and the index mapping hardware is adapted to index multi-dimensional arrays into the cache memory using multiple access passes and at least one array of handles into other arrays.

7. The device of claim 1, wherein the cache memory includes a plurality of memory cells adapted for caching array data traffic separate from other data traffic, and at least one register adapted for storing access information for accessing at least one array cached in the plurality of memory cells.

8. The device of claim 7, wherein the access information includes an array ID for identifying an array of memory cells within the plurality of memory cells, array height information, array width information, and array stride information.

9. A device for communicating with a processor and for caching array data, comprising:
   a cache memory configured to store a plurality of m-dimensional arrays;
   an index mapping hardware configured to communicate with the cache memory and to index the m-dimensional arrays in the cache memory using array attributes, the index mapping hardware to support n-dimensional arrays in a single pass; and
   array attribute storage hardware configured to store the array attributes used to index the m-dimensional arrays into the cache memory, to receive an array handle from the processor, and to provide selected array attributes to the index mapping hardware configured according to the received array handle,
   wherein m equals n, and the index mapping hardware is adapted to index multi-dimensional arrays into the cache memory using a single access pass.

10. The device of claim 9, wherein the cache memory includes a plurality of memory cells adapted for caching array data traffic separate from other data traffic, and at least one register adapted for storing access information for accessing at least one array cached in the plurality of memory cells.

11. The device of claim 10, wherein the access information includes an array ID for identifying an array of memory cells within the plurality of memory cells, array height information, array width information, and array stride information.

12. The device of claim 10, wherein the access information includes an array ID for identifying an array of memory cells within the plurality of memory cells.

13. The device of claim 10, wherein the access information includes array information used for offset and boundary calculations.

14. The device of claim 10, wherein each of the at least one register contains information that corresponds to an array data structure within a main memory.

15. A device for communicating with a processor and for caching array data, comprising:
   a cache memory configured to store a plurality of m-dimensional arrays;
   an index mapping hardware configured to communicate with the cache memory and to index the m-dimensional arrays in the cache memory using array attributes, the index mapping hardware to support n-dimensional arrays in a single pass; and
   array attribute storage hardware configured to store the array attributes used to index the m-dimensional arrays into the cache memory, to receive an array handle from the processor, and to provide selected array attributes to the index mapping hardware configured according to the received array handle,
   wherein m is less than n, and the index mapping hardware is adapted to index multi-dimensional arrays into the cache memory using multiple access passes and at least one array of handles into other arrays.

16. The device of claim 15, wherein the cache memory includes a plurality of memory cells adapted for caching array data traffic separate from other data traffic, and at least one register adapted for storing access information for accessing at least one array cached in the plurality of memory cells.

17. The device of claim 16, wherein the access information includes an array ID for identifying an array of memory cells within the plurality of memory cells, array height information, array width information, and array stride information.

18. The device of claim 16, wherein the access information includes an array ID for identifying an array of memory cells within the plurality of memory cells.

19. The device of claim 16, wherein the access information includes array information used for offset and boundary calculations.

20. The device of claim 16, wherein each of the at least one register contains information that corresponds to an array data structure within a main memory.

* * * * *

UNITED STATES PATENT AND TRADEMARK OFFICE
CERTIFICATE OF CORRECTION

PATENT NO. : 7,577,790 B2  Page 1 of 1
APPLICATION NO. : 11/381658
DATED : August 18, 2009
INVENTOR(S) : Hu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 293 days.

Signed and Sealed this

Seventh Day of September, 2010

David J. Kappos
*Director of the United States Patent and Trademark Office*